(12) United States Patent
Shimada et al.

(10) Patent No.: US 9,193,621 B2
(45) Date of Patent: Nov. 24, 2015

(54) HEAT-ABSORBING GLASS PLATE AND PROCESS FOR ITS PRODUCTION

(71) Applicant: ASAHI GLASS COMPANY, LIMITED, Chiyoda-ku (JP)

(72) Inventors: Yuya Shimada, Chiyoda-ku (JP); Tomoyuki Kobayashi, Chiyoda-ku (JP); Yuki Kondo, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 27 days.

(21) Appl. No.: 13/950,613

(22) Filed: Jul. 25, 2013

(65) Prior Publication Data

US 2013/0306900 A1 Nov. 21, 2013

Related U.S. Application Data (63) Continuation of application No. PCT/JP2012/051113, filed on Jan. 19, 2012.

(30) Foreign Application Priority Data

Jan. 25, 2011 (JP) .................................. 2011-012847

(51) Int. Cl.
  *C03C 3/087* (2006.01)
  *C03C 4/08* (2006.01)
  *C03C 4/02* (2006.01)
  *B60J 3/00* (2006.01)

(52) U.S. Cl.
  CPC . *C03C 3/087* (2013.01); *C03C 4/02* (2013.01); *C03C 4/08* (2013.01); *B60J 3/007* (2013.01)

(58) Field of Classification Search
  CPC ............ C03C 3/087; C03C 4/02; C03C 4/08; C03C 4/085; C03B 17/00; C03B 17/06; C03B 18/02
  USPC .......................................................... 501/70
  See application file for complete search history.

(56) References Cited

U.S. PATENT DOCUMENTS

| 4,792,536 | A | 12/1988 | Pecoraro et al. | |
| 5,593,929 | A | 1/1997 | Krumwiede et al. | |
| 6,551,953 | B1 | 4/2003 | Gulotta et al. | |
| 8,518,843 | B2 * | 8/2013 | Shimada et al. | 501/70 |
| 2006/0217257 | A1 * | 9/2006 | Nagashima et al. | 501/70 |
| 2007/0027021 | A1 * | 2/2007 | Shelestak | 501/70 |
| 2009/0000335 | A1 | 1/2009 | Urata et al. | |
| 2012/0202677 | A1 * | 8/2012 | Shimada et al. | 501/70 |

FOREIGN PATENT DOCUMENTS

| CN | 1087612 A | 6/1994 |
| CN | 101410333 A | 4/2009 |
| JP | 60-215546 | 10/1985 |
| JP | 8-500811 | 1/1996 |
| JP | 2010-522686 | 7/2010 |
| JP | 2010-275144 | 12/2010 |
| WO | 2007/125713 | 11/2007 |

OTHER PUBLICATIONS

U.S. Appl. No. 14/304,013, filed Jun. 13, 2014, Shimada, et al.
U.S. Appl. No. 14/304,302, filed Jun. 13, 2014, Shimada, et al.
International Search Report issued Apr. 17, 2012 in PCT/JP2012/051113 filed Jan. 19, 2012.
U.S. Appl. No. 14/444,362, filed Jul. 28. 2014, Shimada, et al.

* cited by examiner

*Primary Examiner* — Anthony J Green
*Assistant Examiner* — Elizabeth A Bolden
(74) *Attorney, Agent, or Firm* — Oblon, McClelland, Maier & Neustadt, L.L.P.

(57) ABSTRACT

To provide a heat-absorbing glass plate which satisfies both low solar transmittance and high visible light transmittance, presents a green color as transmitted light and contains a small number of coloring components. The heat-absorbing glass plate of the present invention has a solar transmittance of at most 42% calculated as 4 mm thickness, has a visible light transmittance (by illuminant A, 2° visual field) of at least 70% calculated as 4 mm thickness, and provides a transmitted light having a dominant wavelength of from 492 to 520 nm, and it is made of soda lime silica glass having substantially the following composition, as represented by mass % based on oxides. $SiO_2$: 65 to 75%, $Al_2O_3$: more than 3% and at most 6%, MgO: at least 0% and less than 2%, CaO: 7 to 10%, total iron as calculated as $Fe_2O_3$: 0.45 to 0.65%, and $TiO_2$: 0.2 to 0.8%, and contains substantially no member selected from the group consisting of CoO, $Cr_2O_3$, $V_2O_5$ and MnO, wherein the proportion of the mass of divalent FeO in the mass of total iron which is the amount of total iron as calculated as $Fe_2O_3$, is more than 42% and at most 60%.

5 Claims, 2 Drawing Sheets

HEAT-ABSORBING GLASS PLATE AND PROCESS FOR ITS PRODUCTION

TECHNICAL FIELD

The present invention relates to a heat-absorbing glass plate and a process for its production.

BACKGROUND ART

As a heat-absorbing glass plate for an automobile, one made of soda lime silica glass which is green or blue as it contains coloring components, has been known.

A heat-absorbing glass plate is required to have a low solar transmittance, for example, a solar transmittance as defined in JIS R3106 (1998) (hereinafter sometimes referred to as Te) of at most 42% calculated as 4 mm thickness. Further, it is required to have a high visible light transmittance, for example, a visible light transmittance as defined in JIS R3106 (1998) (illuminant A, 2° visual field) (hereinafter sometimes referred to as Tv) of at least 70% calculated as 4 mm thickness.

Further, as a heat-absorbing glass plate, a glass plate having a green color tends to be preferred which presents a more natural color of a transmitted light when a passenger looks out of window through the glass plate.

Further, for a heat-absorbing glass plate, with a view to suppressing inclusion of impurities when the glass base (type of glass) to be used for production of glass is changed in a melting furnace and in view of the cost, it is required to reduce the number of the coloring components as far as possible and to reduce the unit price of the material for the coloring components.

As a heat-absorbing glass plate, for example, the following (1) and (2) have been proposed.

(1) A heat-absorbing glass plate (Patent Document 1) which is made of soda lime silica glass having a Redox of from 0.38 to 0.60,
containing from 0.005 to 0.18% of $SO_3$ as represented by mass % based on oxides, and containing substantially no polysulfide, and
which contains, as coloring components, any one of I) to V) as represented by mass % or by mass ppm:
I) total iron as calculated as $Fe_2O_3$: 0.6 to 4%,
   FeO: 0.23 to 2.4%,
   CoO: 40 to 500 ppm,
   Se: 5 to 70 ppm,
   $Cr_2O_3$: 15 to 800 ppm,
   $TiO_2$: 0.02 to 1%.
II) total iron as calculated as $Fe_2O_3$: 0.4 to 1%,
   CoO: 4 to 40 ppm,
   $Cr_2O_3$: 0 to 100 ppm.
III) total iron as calculated as $Fe_2O_3$: 0.9 to 2%,
   FeO: 0.34 to 1.2%,
   CoO: 90 to 250 ppm,
   Se: 0 to 12 ppm,
   $TiO_2$: 0 to 0.9%.
IV) total iron as calculated as $Fe_2O_3$: 0.7 to 2.2%,
   FeO: 0.266 to 1.32%,
   Se: 3 to 100 ppm,
   CoO: 0 to 100 ppm.
V) total iron as calculated as $Fe_2O_3$: 0.9 to 2%,
   FeO: 0.34 to 1.2%,
   CoO: 40 to 150 ppm,
   $Cr_2O_3$: 250 to 800 ppm,
   $TiO_2$: 0.1 to 1%.

(2) A heat-absorbing glass plate (Patent Document 2) which is made of soda lime silica glass containing, as coloring components, as represented by mass % or mass ppm based on oxides:
total iron as calculated as $Fe_2O_3$: 0.45 to 0.65%,
divalent iron as calculated as FeO: 0.23 to 0.28% and
CoO: 0 to 3 ppm, and
having a mass ratio of FeO/total $Fe_2O_3$ of from 0.35 to 0.55.

Some of heat-absorbing glass plates (1) satisfy Te≤42% (calculated as 4 mm thickness) and Tv≥70% (calculated as 4 mm thickness), but they are blue. Further, the glass plate (1) contains a large number of coloring components $Cr_2O_3$, CoO, etc., and accordingly there are problems of costs and inclusion of impurities when the glass base is changed.

Some of heat-absorbing glass plates (2) satisfy Te≤42% (calculated as 4 mm thickness) and Tv≥70% (calculated as 4 mm thickness), but they are blue. Further, when such a heat-absorbing glass plate contains CoO, there is a problem of inclusion of impurities when the glass base is changed, since CoO makes the glass blue even in a small amount.

As described above, with the heat-absorbing glass plates as disclosed in Patent Documents 1 and 2, it has been difficult to obtain one which presents green transmitted light and contains a small number of coloring components, while satisfying Te≤42% (calculated as 4 mm thickness) and Tv≥70% (calculated as 4 mm thickness).

PRIOR ART DOCUMENTS

Patent Documents

Patent Document 1: U.S. Pat. No. 6,673,730
Patent Document 2: WO2007/125713

DISCLOSURE OF INVENTION

Technical Problem

The present invention is to provide a heat-absorbing glass plate which satisfies both low solar transmittance and high visible light transmittance, presents a green color as transmitted light and contains a small number of coloring components, and a process for its production.

Solution to Problem

The heat-absorbing glass plate of the present invention is a heat-absorbing glass plate
which has a solar transmittance (Te) of at most 42% calculated as 4 mm thickness of the glass plate as defined in JIS R3106 (1998),
which has a visible light transmittance (Tv) (by illuminant A, 2° visual field) of at least 70% calculated as 4 mm thickness of the glass plate as defined in JIS R3106 (1998),
which provides a transmitted light having a dominant wavelength of from 492 to 520 nm as defined in JIS Z8701 (1982), and
which is made of soda lime silica glass having substantially the following composition, as represented by mass % based on oxides:
$SiO_2$: 65 to 75%,
$Al_2O_3$: more than 3% and at most 6%,
MgO: at least 0% and less than 2%,
CaO: 7 to 10%,
total iron as calculated as $Fe_2O_3$: 0.45 to 0.65%, and
$TiO_2$: 0.2 to 0.8%, and containing substantially no member selected from the group consisting of CoO, $Cr_2O_3$, $V_2O_5$ and MnO, wherein the proportion of the mass of divalent FeO in the mass of total iron which is the amount of total iron as calculated as $Fe_2O_3$, is more than 42% and at most 60%.

Further, the heat-absorbing glass plate of the present invention is a heat-absorbing glass plate which has a solar transmittance of at most 42% calculated as 4 mm thickness of the glass plate as defined in JIS R3106 (1998), which has a visible light transmittance (by illuminant A, 2° visual field) of at least 70% calculated as 4 mm thickness of the glass plate as defined in JIS R3106 (1998), which provides a transmitted light having a dominant wavelength of from 492 to 520 nm as defined in JIS Z8701 (1982), and which comprises, as represented by mass % based on the following oxides:

$SiO_2$: 65 to 75%,
$Al_2O_3$: more than 3% and at most 6%
MgO: at least 0% and less than 2%,
CaO: 7 to 10%,
$Na_2O$: 5 to 18%,
$K_2O$: 0 to 5%,
total iron as calculated as $Fe_2O_3$: 0.45 to 0.65%, and
$TiO_2$: 0.2 to 0.8%, and which contains substantially no member selected from the group consisting of CoO, $Cr_2O_3$, $V_2O_5$ and MnO, wherein the proportion of the mass of divalent FeO in the mass of total iron which is the amount of total iron as calculated as $Fe_2O_3$, is more than 42% and at most 60%.

The heat-absorbing glass plate of the present invention preferably contains $CeO_2$ within a range of more than 0% and at most 3% as represented by mass % based on oxides and has an ultraviolet transmittance (Tuv) of at most 12% as defined in ISO-9050. When it contains $CeO_2$ like this, the content of total iron as calculated as $Fe_2O_3$ is preferably from 0.47 to 0.60%.

The heat-absorbing glass plate of the present invention preferably has $\beta_{-OH}$ of from 0.20 to 0.35 $mm^{-1}$.

The process for producing a heat-absorbing glass plate of the present invention comprises melting a glass raw material, followed by forming to produce soda lime silica glass thereby to obtain a heat-absorbing glass plate, wherein the glass after the forming comprises, as represented by mass % based on oxides:

$SiO_2$: 65 to 75%,
$Al_2O_3$: more than 3% and at most 6%
MgO: at least 0% and less than 2%,
CaO: 7 to 10%,
total iron as calculated as $Fe_2O_3$: 0.45 to 0.65%, and
$TiO_2$: 0.2 to 0.8%, and contains substantially no member selected from the group consisting of CoO, $Cr_2O_3$, $V_2O_5$ and MnO, wherein the proportion of the mass of divalent FeO in the mass of total iron which is the amount of total iron as calculated as $Fe_2O_3$, is more than 42% and at most 60%, and the glass after the forming has a solar transmittance of at most 42% calculated as 4 mm thickness of the glass plate as defined in JIS R3106 (1998), has a visible light transmittance (by illuminant A, 2° visual field) of at least 70% calculated as 4 mm thickness of the glass plate as defined in JIS R3106 (1998), and provides a transmitted light having a dominant wavelength (Dw) of from 492 to 520 nm as defined in JIS Z8701 (1982).

Further, the process for producing a heat-absorbing glass plate of the present invention comprises melting a glass raw material, followed by forming to produce soda lime silica glass thereby to obtain a heat-absorbing glass plate, wherein the glass after the forming comprises, as represented by mass % based on oxides:

$SiO_2$: 65 to 75%,
$Al_2O_3$: more than 3% and at most 6%
MgO: at least 0% and less than 2%,
CaO: 7 to 10%,
$Na_2O$: 5 to 18%,
$K_2O$: 0 to 5%,
total iron as calculated as $Fe_2O_3$: 0.45 to 0.65%, and
$TiO_2$: 0.2 to 0.8%, and contains substantially no member selected from the group consisting of CoO, $Cr_2O_3$, $V_2O_5$ and MnO, wherein the proportion of the mass of divalent FeO in the mass of total iron which is the amount of total iron as calculated as $Fe_2O_3$, is more than 42% and at most 60%, and the glass after the forming has a solar transmittance of at most 42% calculated as 4 mm thickness of the glass plate as defined in JIS R3106 (1998), has a visible light transmittance (by illuminant A, 2° visual field) of at least 70% calculated as 4 mm thickness of the glass plate as defined in JIS R3106 (1998), and provides a transmitted light having a dominant wavelength of from 492 to 520 nm as defined in JIS Z8701 (1982).

The expression "to" defining the above numerical range is used to include the numerical values before and after it as the lower limit value and the upper limit value, and hereinafter in this specification, "to" is used to have the same meaning unless otherwise specified.

Advantageous Effects of Invention

The heat-absorbing glass plate of the present invention satisfies both low solar transmittance and high visible light transmittance, presents a green color as transmitted light and contains a small number of coloring components. Particularly, according to the present invention, it is possible to obtain a heat-absorbing glass plate which has a solar transmittance of at most 42% and a visible light transmittance of at least 70% and which provides a transmitted light having a dominant wavelength of from 492 to 520 nm and having a green color.

Further, with the composition having Ce added, it is possible to obtain a heat-absorbing glass plate having a low ultraviolet transmittance, while satisfying both low solar transmittance and high visible light transmittance, and presenting a green color as transmitted light.

DESCRIPTION OF EMBODIMENTS

The heat-absorbing glass plate of the present invention is characterized by satisfying Te≤42% (calculated as 4 mm thickness) and Tv≥70% (calculated as 4 mm thickness) and achieving a green transmitted light, by adjusting the content of magnesium as calculated as MgO, the content of total iron as calculated as $Fe_2O_3$, the content of $TiO_2$ and the proportion of the mass of divalent FeO in the mass of total iron as calculated as $Fe_2O_3$.

The content of total iron as calculated as $Fe_2O_3$ is from 0.45 to 0.65% as represented by mass % based on oxides. When the content of total iron as calculated as $Fe_2O_3$ is at least 0.45%, Te can be suppressed low. Along with an increase in the content of total iron as calculated as $Fe_2O_3$, Te is lowered, but Tv is also lowered. When the content of total iron as calculated as $Fe_2O_3$ is made to be at most 0.65%, a decrease of Tv can be prevented, and Tv can be made at least 70% (calculated as 4 mm thickness). Depending upon the presence or absence of $CeO_2$ contained, the preferred range of the content of total iron as calculated as $Fe_2O_3$ changes. In a glass having a $CeO_2$ content of at most 3 mass %, the content of total iron as represented by mass % based on oxides calculated as $Fe_2O_3$ is preferably from 0.47 to 0.60%, more preferably from 0.49 to 0.58%, further preferably from 0.51 to 0.56%. Whereas, in a glass containing no $CeO_2$, it is preferably from 0.55 to 0.64%, more preferably from 0.60 to 0.63%.

In this specification, the content of total iron is represented as an amount of $Fe_2O_3$ in accordance with a standard method of analysis, however, not the entire iron present in glass is present as trivalent iron.

Usually, divalent iron is present in glass. The divalent iron has an absorption peak in the vicinity of a wavelength of 1,100 nm, and trivalent iron has an absorption peak in the vicinity of a wavelength of 400 nm. Accordingly, when attention is focused on the infrared absorptivity, the amount of divalent iron ($Fe^{2+}$) is preferably larger than trivalent iron ($Fe^{3+}$). Accordingly, with a view to suppressing Te to be low, the proportion of the mass of divalent FeO in the mass of total iron as calculated as $Fe_2O_3$ (hereinafter referred to as Redox, i.e. Redox (%) is represented by $Fe^{2+}/(Fe^{2+}+Fe^{3+})$) is preferably increased.

Redox in the heat-absorbing glass plate of the present invention is more than 42% and at most 60%. When Redox is more than 42%, Te can be suppressed to be low. When Redox is at most 60%, the step of melting the glass raw material will not be complicated, and a desired green heat-absorbing glass plate can be obtained along with the addition amounts of $Fe_2O_3$ and $TiO_2$. Redox is preferably from 43 to 55%, more preferably from 44 to 50%.

The heat-absorbing glass plate of the present invention is made of soda lime silica glass having substantially the following composition, as represented by mass % based on oxides:
$SiO_2$: 65 to 75%,
$Al_2O_3$: more than 3% and at most 6%,
MgO: at least 0% and less than 2%,
CaO: 7 to 10%,
total iron as calculated as $Fe_2O_3$: 0.45 to 0.65%, and
$TiO_2$: 0.2 to 0.8%.

Further, the heat-absorbing glass plate of the present invention is made of soda lime silica glass having substantially the following composition as represented by mass % based on oxides:
$SiO_2$: 65 to 75%,
$Al_2O_3$: more than 3% and at most 6%
MgO: at least 0% and less than 2%,
CaO: 7 to 10%,
$Na_2O$: 5 to 18%,
$K_2O$: 0 to 5%,
total iron as calculated as $Fe_2O_3$: 0.45 to 0.65%, and
$TiO_2$: 0.2 to 0.8%.

When the $SiO_2$ content is at least 65%, the weather resistance will be good. When the $SiO_2$ content is at most 75%, devitrification hardly occurs. The $SiO_2$ content is preferably from 67 to 73%, more preferably from 68 to 71%, as represented by mass % based on oxides.

$Al_2O_3$ is a component to improve the weather resistance.

When the $Al_2O_3$ content is more than 3%, the weather resistance will be good. When the $Al_2O_3$ content is at most 6%, the melting property will be good. The $Al_2O_3$ content is preferably from 3.1 to 5%, more preferably from 3.2 to 4%, as represented by mass % based on oxides.

MgO is a component to accelerate melting of the glass raw material and to improve the weather resistance.

When the MgO content is less than 2%, devitrification hardly occurs. Further, with a heat-absorbing glass plate having a MgO content of less than 2%, Te is low, as compared with a heat-absorbing glass plate having a MgO content of 2% or more at the same Tv. Accordingly, when the MgO content is less than 2%, it is possible to easily improve the heat-absorbing property without impairing the visible light transmittance.

The content of MgO is preferably from 0 to 1.0%, more preferably from 0 to 0.5%, as represented by mass % based on oxides.

CaO is a component to accelerate melting of the glass raw material and to improve the weather resistance.

When the CaO content is at least 7%, the melting property and weather resistance will be good. When the CaO content is at most 10%, devitrification hardly occurs. The CaO content is preferably from 7.5 to 9.5%, more preferably from 8 to 9%, as represented by mass % based on oxides.

The $TiO_2$ content is from 0.2 to 0.8 as represented by mass % based on oxides. When the $TiO_2$ content is at least 0.2%, a desired green heat-absorbing glass plate can be obtained by adjusting the amount of $Fe_2O_3$ to be added and the above-described Redox. When the $TiO_2$ content is at most 0.8%, Tv can be made high. The $TiO_2$ content is preferably from 0.25 to 0.5%, more preferably from 0.28 to 0.35%, as represented by mass % based on oxides.

The heat-absorbing glass plate of the present invention may contain SrO in order to accelerate melting of the glass raw material. The content of SrO is preferably from 0 to 5%, more preferably from 0 to 3%, as represented by mass % based on oxides. When the SrO content is at most 5%, it is possible to sufficiently accelerate melting of the glass raw material.

Further, the heat-absorbing glass plate of the present invention may contain BaO in order to accelerate melting of the glass raw material. The content of BaO is preferably from 0 to 5%, more preferably from 0 to 3%, as represented by mass % based on oxides. When the BaO content is at most 5%, it is possible to sufficiently accelerate melting of the glass raw material.

Further, the heat-absorbing glass plate of the present invention may contain $Na_2O$ and/or $K_2O$ in order to accelerate melting of the glass raw material. The total content of $Na_2O$ and $K_2O$ is preferably from 10 to 18%, more preferably from 12 to 17%, further preferably from 13 to 16%, as represented by mass % based on oxides. When the content of $Na_2O+K_2O$ is at least 10%, the melting property will be good. When the content of $Na_2O+K_2O$ is at most 18%, the weather resistance will be good.

The $Na_2O$ content is preferably from 5 to 18%, more preferably from 10 to 16%, further preferably from 12 to 15%. Further, the $K_2O$ content is preferably from 0 to 5%, more preferably from 0 to 2%, further preferably from 0.5 to 1.5%.

In the heat-absorbing glass plate of the present invention, $SnO_2$ may be used as a reducing agent or a refining agent. The $SnO_2$ content is preferably from 0 to 0.5%, more preferably from 0 to 0.3%, further preferably from 0 to 0.1%, as represented by mass % based on oxides. When the $SnO_2$ content is at most 0.5%, volatilization of $SnO_2$ tends to be small, and the cost can be suppressed low.

In the heat-absorbing glass plate of the present invention, $SO_3$ may be used as a refining agent. The $SO_3$ content is preferably from 0 to 1%, more preferably from 0.02 to 0.5%, further preferably from 0.05 to 0.2%, as represented by mass % base on oxides. When the $SO_3$ content is at most 1%, the gas component of $SO_2$ will not remain in glass as bubbles.

In a case where an ultraviolet-absorbing property is required, the heat-absorbing glass plate of the present invention contains $CeO_2$ preferably within a range of more than 0% and at most 3%, more preferably within a range of from 1.0 to 2.0%, as represented by mass % based on oxides. When the $CeO_2$ content is at most 3.0%, the ultraviolet-absorbing property is readily obtainable without lowering Tv, and a green color is readily obtainable.

The heat-absorbing glass plate of the present invention contains substantially no member selected from the group consisting of CoO, $Cr_2O_3$, $V_2O_5$ and MnO being typical coloring components. Containing substantially no member selected from the group consisting of CoO, $Cr_2O_3$, $V_2O_5$ and MnO means that any one of CoO, $Cr_2O_3$, $V_2O_5$ and MnO is not contained at all, or CoO, $Cr_2O_3$, $V_2O_5$ and MnO may be contained as impurities which are inevitably included in the production. When substantially no member selected from the group consisting of CoO, $Cr_2O_3$, $V_2O_5$ and MnO is contained, inclusion of impurities when the glass base is changed can be suppressed, and the cost of the heat-absorbing glass plate can be suppressed.

Here, inclusion of impurities when the glass base is changed means as follows.

During the production, the composition of glass may be changed to another type of glass (i.e. the change of the glass base). Inclusion of impurities when the glass base is changed means that when glass is changed to another type, components of glass before the change are included in glass after the change. If impurities such as CoO, $Cr_2O_3$, $V_2O_5$ and MnO are included, the color of glass after the change is greatly influenced.

The specific gravity of the heat-absorbing glass plate of the present invention is preferably from 2.49 to 2.55, more preferably from 2.50 to 2.53. When the specific gravity of the heat-absorbing glass plate of the present invention is adjusted to be equal to that of conventional soda lime silica glass, the efficiency for the change of the composition (i.e. the change of the glass base) at the time of production can be improved.

The specific gravity of the heat-absorbing glass plate of the present invention can be adjusted by adjusting the glass composition. Specifically, in order to obtain the above specific gravity, the mass ratio of $SiO_2/(MgO+CaO)$ is adjusted to be preferably from 6.0 to 9.0, more preferably from 6.7 to 8.7. Further, also in a case where SrO and/or BaO is contained, the mass ratio of $SiO_2/(MgO+CaO+SrO+BaO)$ is likewise adjusted to be preferably from 6.0 to 9.0, more preferably from 6.7 to 8.7.

Te of the heat-absorbing glass plate of the present invention is at most 42%, preferably at most 40%. In the present invention, Te of the heat-absorbing glass plate means the value of Te when the thickness of the heat-absorbing glass plate is calculated as 4 mm thickness, and in this specification, it may be represented simply by "calculated as 4 mm thickness". Te is the solar transmittance calculated by measuring the transmittance by a spectrophotometer in accordance with JIS R3106 (1998) (hereinafter referred to simply as JIS R3106).

Tv of the heat-absorbing glass plate of the present invention is at least 70%, preferably at least 71.5%. In the present invention, Tv of the heat-absorbing glass plate means the value of Tv when the thickness of the heat-absorbing glass plate is calculated as 4 mm thickness, and in this specification, it may be represented simply by "calculated as 4 mm thickness". Tv is the visible light transmittance calculated by measuring the transmittance by a spectrophotometer in accordance with JIS R3106. The coefficient is a value of the 2 degree field of view with illuminant A.

Tuv (calculated as 4 mm thickness) of the heat-absorbing glass plate of the present invention is at most 12%, preferably at most 10%. In the present invention, Tuv of the heat-absorbing glass plate means the value of Tuv when the thickness of the heat-absorbing glass plate is calculated as 4 mm thickness, and in this specification, it may be represented simply by "calculated as 4 mm thickness". Tuv is the ultraviolet transmittance calculated by measuring the transmittance by a spectrophotometer in accordance with ISO-9050.

The dominant wavelength (Dw) of the transmitted light through the heat-absorbing glass plate of the present invention is from 492 to 520 nm, preferably from 492 to 500 nm. When the dominant wavelength is within such a range, a desired green heat-absorbing glass plate will be obtained. The dominant wavelength is calculated by measuring the transmittance by a spectrophotometer in accordance with JIS Z8701 (1982). The coefficient is a value of the 2 degree field of view with illuminant C.

The heat-absorbing glass plate of the present invention can be used either for vehicles and for building, and is particularly suitable as a windshield, a door glass or a rear glass of an automobile. When it is used as window glass for an automobile, as the case requires, it is formed into laminated glass having an interlayer sandwiched between a plurality of glass plates, glass having flat glass processed to have a curved surface, or tempered glass. Further, when it is used as double glazing for building, it is used as double glazing comprising two sheets of the heat-absorbing glass plates of the present invention or as double glazing of the heat-absorbing glass plate of the present invention and another glass plate.

The heat-absorbing glass plate of the present invention is produced, for example, by means of the following steps (i) to (v) in order.

(i) A glass matrix material such as silica sand, coloring component materials such as an iron source and a titanium source, a reducing agent, a refining agent and the like are mixed to achieve the desired glass composition to prepare a glass raw material.

(ii) The glass raw material is continuously supplied to a melting furnace, heated to a temperature of from about 1,400° C. to 1,550° C. (e.g. about 1,500° C.) by burning heavy oil or the like, and melted to form molten glass.

(iii) The molten glass is refined and then formed into a glass plate having a predetermined thickness by a glass plate-forming method such as a float process.

(iv) The glass plate is annealed and cut into a predetermined size to obtain a heat-absorbing glass plate of the present invention.

(v) As the case requires, the cut glass plate may be tempered, may be formed into laminated glass, or may be formed into double glazing.

The glass matrix material may be one used as a material of conventional soda lime silica glass, such as silica sand, soda ash, lime stone or feldspar.

The iron source may, for example, be iron powder, iron oxide powder or red iron oxide.

The titanium source may, for example, be titanium oxide.

The cerium source may, for example, be cerium oxide.

The reducing agent may, for example, be carbon or coke. The reducing agent is to suppress oxidation of iron in the molten glass and to adjust Redox to a desired level.

In addition, $SnO_2$ may be used as a reducing agent or as a refining agent, and $SO_3$ may be used as a refining agent.

$\beta_{-OH}$ as an index showing the water content in the heat-absorbing glass plate of the present invention, is preferably from 0.20 to 0.35 $mm^{-1}$, more preferably from 0.23 to 0.30 $mm^{-1}$, further preferably from 0.25 to 0.28 $mm^{-1}$. Here, $\beta_{-OH}$ is a value obtained by the following formula.

$$\beta_{-OH}(mm^{-1}) = -\log_{10}(T_{3500}\,cm^{-1}/T_{4000}\,cm^{-1})/t$$

In the above formula, $T_{3500}\,cm^{-1}$ is a transmittance (%) at a wave number of 3,500 $cm^{-1}$, $T_{4000}\,cm^{-1}$ is a transmittance (%) at a wave number of 4,000 $cm^{-1}$, and t is the thickness (mm) of the glass plate.

By adjusting $\beta_{-OH}$ of the heat-absorbing glass plate of the present invention to be higher than $\beta_{-OH}$ of conventional soda lime silica glass, the fining ability can be improved, and the temperature in the bending step can be decreased.

Since the above-described heat-absorbing glass plate of the present invention is made of soda lime silica glass containing, as represented by mass % based on oxides, at least 0% and less than 2% of MgO, from 0.45 to 0.65% of total iron as calculated as $Fe_2O_3$ and from 0.2 to 0.8% of $TiO_2$, containing substantially no member selected from the group consisting of CoO, $Cr_2O_3$, $V_2O_5$ and MnO and having Redox of more than 42% and at most 60%, it satisfies $Te \leq 42\%$ (calculated as 4 mm thickness) and $Tv \geq 70\%$ (calculated as 4 mm thickness), provides a green transmitted light and contains a small number of coloring components.

Particularly, by the heat-absorbing glass plate of the present invention, it is easy to improve the heat-absorbing property without lowering the visible light transmittance, as compared with a heat-absorbing glass plate having a MgO content of 2% or more.

Further, it is possible to easily carry out the change of the glass base at the time of switching from the production of the heat-absorbing glass of the present invention to the production of glass having another composition, and it is possible to suppress an influence on the color against the glass having the glass base changed.

EXAMPLES

Now, the present invention will be described in detail with reference to Examples. However, it should be understood that the present invention is by no means restricted to such specific Examples.

Examples 1 to 18 and 21 to 28 are Examples of the present invention, and Examples 19 and 20 are Comparative Examples.

(Redox)

With respect to the obtained glass plate, Redox was calculated in accordance with the following formula from a spectral curve of glass measured by a spectrophotometer:

$$Redox(\%) = -\log e(T_{1000\,nm}/91.4)/(Fe_2O_3\,amount \times t \times 20.79) \times 100$$

In the above formula, $T_{1000\,nm}$ is the transmittance (%) of the glass plate at a wavelength of 1,000 nm, t is the thickness (cm) of the glass plate, and the $Fe_2O_3$ amount is the content (%=mass percentage) of total iron as calculated as $Fe_2O_3$.

(Te)

With respect to the obtained glass plate, the solar transmittance (Te) as defined in JIS R3106 was obtained as a value calculated as 4 mm thickness.

(Tv)

With respect to the obtained glass plate, the visible light transmittance (Tv) (a value under measuring conditions of illuminant A and 2° visual field) as defined in JIS R3106 was obtained as a value calculated as 4 mm thickness.

(Tuv)

With respect to the obtained glass plate, the ultraviolet transmittance (Tuv) as defined in ISO 9050 was obtained as a value calculated as 4 mm thickness.

(Dw)

With respect to the obtained glass plate, the dominant wavelength (Dw) of the transmitted light as defined in JIS Z8701 (1982) was obtained.

($\beta_{-OH}$)

With respect to the obtained glass plate, $\beta_{-OH}$ was calculated in accordance with the following formula from an infrared absorption spectral curve of glass measured by FT-IR.

$$\beta_{-OH}(mm^{-1}) = -\log_{10}(T_{3500}\,cm^{-1}/T_{4000}\,cm^{-1})/t$$

In the above formula, $T_{3500}\,cm^{-1}$ is the transmittance (%) at a wave number of 3,500 $cm^{-1}$, $T_{4000}\,cm^{-1}$ is the transmittance (%) at a wave number of 4,000 $cm^{-1}$, and t is the thickness (mm) of the glass plate.

Examples 1 to 28

The respective materials were mixed to achieve compositions as identified in Tables 1 to 5 to prepare glass raw materials. Each glass raw material was put into a crucible and heated in an electric furnace at 1,500° C. to form molten glass. The molten glass was cast on a carbon plate and cooled. Both surfaces of the obtained plate-form glass were polished to obtain a glass plate having a thickness of 4 mm. With respect to the glass plate, the transmittance was measured every 1 nm by using a spectrophotometer (manufactured by PerkinElmer Co., Ltd., Lambda 950) to determine Te, Tv, Tuv and Dw. Further, the above glass was polished to a thickness of 2 mm, and with respect to this glass plate, the transmittance was measured every 1 $cm^{-1}$ by FT-IR (manufactured by Thermo Nicolet Corporation, Thermo Nicolet Avatar 370), and $\beta_{-OH}$ was obtained based on the above formula. The results are shown in Tables 1 to 5.

TABLE 1

| | | Ex. 1 | Ex. 2 | Ex. 3 | Ex. 4 | Ex. 5 |
|---|---|---|---|---|---|---|
| Composition (%) | $SiO_2$ | 68.9 | 68.9 | 69.0 | 68.6 | 68.7 |
| | $Al_2O_3$ | 3.5 | 3.5 | 3.5 | 4.3 | 4.3 |
| | MgO | 0.0 | 0.0 | 0.3 | 0.0 | 0.3 |
| | CaO | 10.0 | 10.0 | 9.6 | 9.1 | 8.7 |
| | SrO | 0.0 | 0.0 | 0.0 | 0.0 | 0.0 |
| | BaO | 0.0 | 0.0 | 0.0 | 0.0 | 0.0 |
| | $Na_2O$ | 14.5 | 14.5 | 14.5 | 15.0 | 15.0 |
| | $K_2O$ | 0.3 | 0.3 | 0.3 | 0.3 | 0.3 |
| | $Fe_2O_3$ | 0.54 | 0.54 | 0.53 | 0.53 | 0.53 |
| | $TiO_2$ | 0.31 | 0.31 | 0.31 | 0.31 | 0.31 |
| | $CeO_2$ | 1.85 | 1.85 | 1.85 | 1.85 | 1.85 |
| | Redox | 55 | 51 | 49 | 54 | 50 |
| Tv (calculated as 4 mm thickness) [%] | | 71.4 | 72.2 | 71.6 | 71.7 | 72.0 |
| Te (calculated as 4 mm thickness) [%] | | 37.4 | 38.8 | 38.1 | 37.8 | 38.9 |
| Tuv (calculated as 4 mm thickness) [%] | | 9.5 | 9.3 | 9.7 | 9.4 | 9.5 |
| Dw [nm] | | 494 | 495 | 494 | 494 | 495 |

TABLE 1-continued

|  | Ex. 1 | Ex. 2 | Ex. 3 | Ex. 4 | Ex. 5 |
|---|---|---|---|---|---|
| $\beta_{-OH}$ [mm$^{-1}$] | 0.21 | 0.34 | 0.24 | 0.21 | 0.29 |
| $T_{730}$ [%] | 31.5 | 33.8 | 34.9 | 32.3 | 33.4 |
| $T_{1650}$ [%] | 25.1 | 27.6 | 31.3 | 25.9 | 30.1 |
| $T_{800}$ [%] | 18.8 | 21.0 | 22.2 | 19.6 | 21.0 |
| $T_{1000}$ [%] | 8.1 | 9.6 | 10.9 | 8.6 | 10.3 |

TABLE 2

|  |  | Ex. 6 | Ex. 7 | Ex. 8 | Ex. 9 | Ex. 10 |
|---|---|---|---|---|---|---|
| Composition (%) | SiO$_2$ | 69.0 | 68.5 | 69.1 | 69.1 | 68.1 |
|  | Al$_2$O$_3$ | 3.5 | 3.5 | 3.5 | 3.5 | 4.2 |
|  | MgO | 0.1 | 0.0 | 0.3 | 0.3 | 0.3 |
|  | CaO | 9.9 | 10.0 | 9.7 | 9.6 | 8.9 |
|  | SrO | 0.0 | 0.0 | 0.0 | 0.0 | 0.0 |
|  | BaO | 0.0 | 0.0 | 0.0 | 0.0 | 0.0 |
|  | Na$_2$O | 14.5 | 14.4 | 14.6 | 14.5 | 14.3 |
|  | K$_2$O | 0.3 | 0.9 | 0.3 | 0.3 | 1.5 |
|  | Fe$_2$O$_3$ | 0.53 | 0.53 | 0.54 | 0.52 | 0.53 |
|  | TiO$_2$ | 0.31 | 0.31 | 0.34 | 0.34 | 0.31 |
|  | CeO$_2$ | 1.85 | 1.85 | 1.68 | 1.78 | 1.85 |
| Redox |  | 46 | 48 | 44 | 53 | 47 |
| Tv (calculated as 4 mm thickness) [%] |  | 73.7 | 73.8 | 73.9 | 72.6 | 74.3 |
| Te (calculated as 4 mm thickness) [%] |  | 41.1 | 40.6 | 41.7 | 39.1 | 42.7 |
| Tuv (calculated as 4 mm thickness) [%] |  | 9.1 | 9.3 | 9.5 | 9.5 | 9.1 |
| Dw [nm] |  | 496 | 496 | 498 | 496 | 499 |
| $\beta_{-OH}$ [mm$^{-1}$] |  | 0.25 | 0.28 | 0.27 | 0.33 | 0.22 |
| $T_{730}$ [%] |  | 37.3 | 36.7 | 37.7 | 33.3 | 36.3 |
| $T_{1650}$ [%] |  | 32.2 | 30.1 | 34.0 | 29.5 | 32.7 |
| $T_{800}$ [%] |  | 24.3 | 23.6 | 24.7 | 20.6 | 23.6 |
| $T_{1000}$ [%] |  | 12.1 | 11.3 | 12.9 | 9.8 | 12.0 |

TABLE 3

|  |  | Ex. 11 | Ex. 12 | Ex. 13 | Ex. 14 | Ex. 15 |
|---|---|---|---|---|---|---|
| Composition (%) | SiO$_2$ | 68.0 | 70.1 | 70.1 | 69.2 | 69.8 |
|  | Al$_2$O$_3$ | 4.2 | 3.5 | 3.5 | 3.2 | 3.2 |
|  | MgO | 0.0 | 0.3 | 0.3 | 0.3 | 0.3 |
|  | CaO | 9.3 | 9.6 | 9.6 | 9.3 | 8.7 |
|  | SrO | 0.0 | 0.0 | 0.0 | 0.0 | 0.0 |
|  | BaO | 0.0 | 0.0 | 0.0 | 0.0 | 0.0 |
|  | Na$_2$O | 14.3 | 12.5 | 12.5 | 14.0 | 14.1 |
|  | K$_2$O | 1.5 | 1.2 | 1.2 | 1.1 | 1.1 |
|  | Fe$_2$O$_3$ | 0.53 | 0.55 | 0.57 | 0.56 | 0.56 |
|  | TiO$_2$ | 0.31 | 0.31 | 0.31 | 0.31 | 0.31 |
|  | CeO$_2$ | 1.85 | 1.85 | 1.85 | 1.85 | 1.85 |
| Redox |  | 46 | 43 | 47 | 55 | 50 |
| Tv (calculated as 4 mm thickness) [%] |  | 73.3 | 74.0 | 72.0 | 71.0 | 72.0 |
| Te (calculated as 4 mm thickness) [%] |  | 40.9 | 41.8 | 38.8 | 36.6 | 38.3 |
| Tuv (calculated as 4 mm thickness) [%] |  | 9.2 | 8.8 | 8.9 | 9.3 | 9.3 |
| Dw [nm] |  | 497 | 500 | 497 | 494 | 496 |
| $\beta_{-OH}$ [mm$^{-1}$] |  | 0.24 | 0.3 | 0.28 | 0.27 | 0.27 |
| $T_{730}$ [%] |  | 37.2 | 38.3 | 33.5 | 29.5 | 32.8 |
| $T_{1650}$ [%] |  | 31.3 | 34.0 | 29.3 | 25.0 | 27.9 |
| $T_{800}$ [%] |  | 24.2 | 25.2 | 20.6 | 17.0 | 20.1 |
| $T_{1000}$ [%] |  | 12.0 | 13.1 | 10.1 | 7.3 | 9.3 |

TABLE 4

|  |  | Ex. 16 | Ex. 17 | Ex. 18 | Ex. 19 | Ex. 20 |
|---|---|---|---|---|---|---|
| Composition (%) | SiO$_2$ | 71.4 | 71.4 | 71.0 | 68.3 | 71.1 |
|  | Al$_2$O$_3$ | 3.6 | 3.6 | 3.3 | 3.5 | 1.9 |
|  | MgO | 0.3 | 0.3 | 0.3 | 0.3 | 0.0 |
|  | CaO | 9.8 | 9.8 | 8.9 | 9.4 | 13.2 |
|  | SrO | 0.0 | 0.0 | 0.0 | 0.0 | 0.0 |
|  | BaO | 0.0 | 0.0 | 0.0 | 0.0 | 0.0 |
|  | Na$_2$O | 12.8 | 12.8 | 14.5 | 14.5 | 12.9 |
|  | K$_2$O | 1.2 | 1.2 | 1.1 | 1.2 | 0.3 |
|  | Fe$_2$O$_3$ | 0.62 | 0.62 | 0.62 | 0.54 | 0.64 |
|  | TiO$_2$ | 0.30 | 0.30 | 0.30 | 0.31 | 0.00 |
|  | CeO$_2$ | 0.00 | 0.00 | 0.00 | 1.86 | 0.00 |
| Redox |  | 54 | 49 | 49 | 40 | 49 |
| Tv (calculated as 4 mm thickness) [%] |  | 70.8 | 71.8 | 71.6 | 74.8 | 70.9 |
| Te (calculated as 4 mm thickness) [%] |  | 36.6 | 38.1 | 37.8 | 43.7 | 37.5 |
| Tuv (calculated as 4 mm thickness) [%] |  | 29.2 | 28.7 | 27.9 | 9.0 | 31.2 |
| Dw [nm] |  | 492 | 492 | 492 | 499 | 489 |
| $\beta_{-OH}$ [mm$^{-1}$] |  | 0.22 | 0.33 | 0.29 | 0.24 | 0.22 |
| $T_{730}$ [%] |  | 28.6 | 31.1 | 30.9 | 40.0 | 29.6 |
| $T_{1650}$ [%] |  | 23.5 | 26.0 | 24.9 | 37.7 | 23.6 |
| $T_{800}$ [%] |  | 16.2 | 18.4 | 18.4 | 27.1 | 17.2 |
| $T_{1000}$ [%] |  | 6.5 | 7.9 | 7.5 | 16.0 | 7.0 |

TABLE 5

|  |  | Ex. 21 | Ex. 22 | Ex. 23 | Ex. 24 | Ex. 25 | Ex. 26 | Ex. 27 | Ex. 28 |
|---|---|---|---|---|---|---|---|---|---|
| Composition (%) | SiO$_2$ | 70.0 | 71.9 | 70.2 | 70.2 | 70.2 | 70.2 | 70.2 | 71.2 |
|  | Al$_2$O$_3$ | 3.2 | 3.2 | 3.2 | 3.2 | 3.2 | 3.2 | 3.2 | 3.3 |
|  | MgO | 0.6 | 0.3 | 0.3 | 0.3 | 0.3 | 0.3 | 0.3 | 0.3 |
|  | CaO | 8.3 | 8.7 | 8.7 | 8.7 | 8.7 | 8.7 | 8.7 | 8.9 |
|  | SrO | 0.0 | 0.0 | 0.0 | 0.0 | 0.0 | 0.0 | 0.0 | 0.0 |
|  | BaO | 0.0 | 0.0 | 0.0 | 0.0 | 0.0 | 0.0 | 0.0 | 0.0 |
|  | Na$_2$O | 14.1 | 12.1 | 14.1 | 14.1 | 14.1 | 14.1 | 14.1 | 14.3 |
|  | K$_2$O | 1.1 | 1.1 | 1.1 | 1.1 | 1.1 | 1.1 | 1.1 | 1.1 |
|  | Fe$_2$O$_3$ | 0.56 | 0.56 | 0.56 | 0.56 | 0.53 | 0.54 | 0.56 | 0.68 |
|  | TiO$_2$ | 0.31 | 0.31 | 0.49 | 0.49 | 0.64 | 0.71 | 0.42 | 0.22 |
|  | CeO$_2$ | 1.84 | 1.84 | 1.30 | 1.30 | 1.10 | 1.30 | 1.30 |  |
| Redox |  | 58 | 56 | 55 | 54 | 49 | 58 | 59 | 43 |
| Tv (calculated as 4 mm thickness) [%] |  | 70.5 | 70.2 | 71.1 | 71.0 | 73.1 | 70.5 | 70.3 | 71.9 |
| Te (calculated as 4 mm thickness) [%] |  | 35.6 | 35.2 | 36.7 | 36.7 | 40.0 | 35.9 | 35.4 | 38.4 |
| Tuv (calculated as 4 mm thickness) [%] |  | 9.9 | 8.9 | 10.4 | 10.2 | 10.4 | 10.0 | 11.2 | 27.9 |
| Dw [nm] |  | 493 | 504 | 496 | 499 | 505 | 503 | 494 | 492 |
| $\beta_{-OH}$ [mm$^{-1}$] |  | 0.23 | 0.28 | 0.32 | 0.24 | 0.26 | 0.22 | 0.31 | 0.33 |
| $T_{730}$ [%] |  | 27.5 | 29.2 | 30.3 | 30.7 | 36.0 | 29.7 | 28.0 | 31.4 |

TABLE 5-continued

|  | Ex. 21 | Ex. 22 | Ex. 23 | Ex. 24 | Ex. 25 | Ex. 26 | Ex. 27 | Ex. 28 |
|---|---|---|---|---|---|---|---|---|
| $T_{1650}$ [%] | 23.7 | 23.4 | 25.4 | 25.5 | 30.9 | 24.7 | 22.6 | 26.3 |
| $T_{800}$ [%] | 15.4 | 16.6 | 17.7 | 18.2 | 23.1 | 17.3 | 15.8 | 18.7 |
| $T_{1000}$ [%] | 6.3 | 6.8 | 7.6 | 7.8 | 11.1 | 7.3 | 6.1 | 8.3 |

Each of the heat-absorbing glass plates of the present invention in Examples 1 to 18 and 21 to 28 satisfied Te≤42% (calculated as 4 mm thickness) and Tv≥70% (calculated as 4 mm thickness), and the transmitted light was green. Particularly, in Examples 1 to 15 and 21 to 27 wherein $CeO_2$ was contained, Tuv was low.

The glass plate in Example 19, Redox was less than 42%, and accordingly, Te (calculated as 4 mm thickness) exceeded 42%.

The glass plate in Example 20 contained no $TiO_2$, and accordingly, the transmitted light was blue (Dw was 489).

[Effects Obtainable by Adjusting the MgO Content to be at Least 0% and Less than 2%]

Now, effects obtainable by adjusting the MgO content to be at least 0% and less than 2%, will be specifically described.

Figure 1:
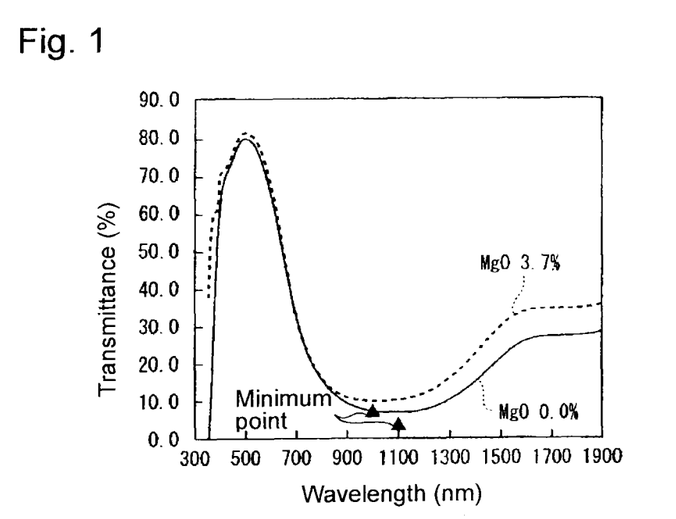
FIG. 1 is spectral transmittance curves of an example of a glass plate having a MgO content of 0 mass % and an example of a glass plate having a MgO content of 3.7 mass %.
Figure 2:
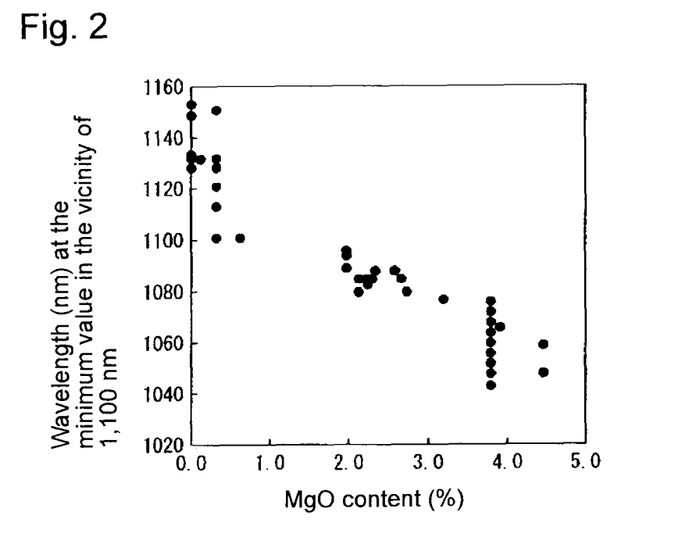
FIG. 2 is a graph showing a relation between the MgO content and the wavelength at the minimum value in the vicinity of 1,100 nm.

The present inventors measured the spectral transmittance curves with respect to glass plates different in the MgO content, i.e. two types of glass having MgO contents of 0% and 3.7%, respectively, whereby it was found that as shown in FIG. 1, as the MgO content in the glass plate is reduced, the minimum point appearing in the vicinity of the wavelength of 1,100 nm in the spectral transmittance curve tends to be displaced towards the long wavelength side. It was further found that as shown in FIG. 2, the degree of such displacement becomes large as MgO decreases.

As the minimum point in the vicinity of the wavelength of 1,100 nm was displaced towards the long wavelength side as mentioned above, the transmittance of visible light (wavelength: from about 400 to 800 nm) became high. However, as will be discussed below, the relation between Tv and Te did not show a simple tendency with respect to the MgO content.

Figure 3:
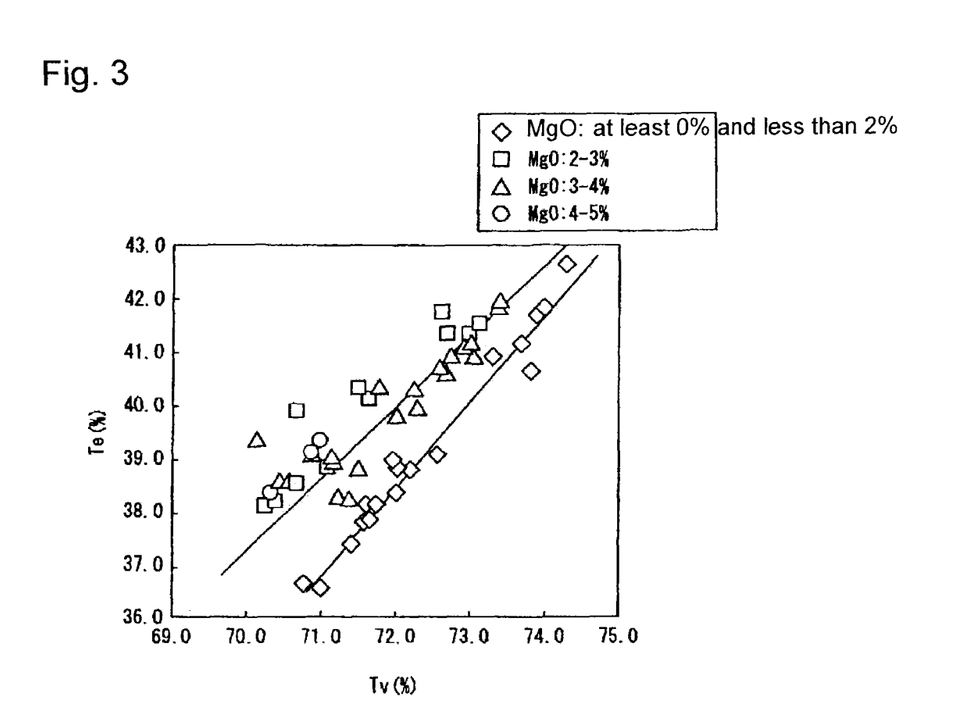
FIG. 3 is a graph showing a relation between Tv and Te with respect to glass plates having MgO contents of from 0 to 5%.

With respect to heat-absorbing glass plates having MgO contents of at least 0% and less than 5%, the present inventors plotted the relation between Tv and Te as shown in FIG. 3, whereby it was found that each of the case having a MgO content of at least 0% and less than 2%, and the case having a MgO content of at least 2% and less than 5%, can be approximated by a linear function, but the respective linear functions are different from each other. That is, the approximate function (Te=1.65Tv−80.0) for the MgO content of at least 0% and less than 2%, was located on the right hand side as compared to the approximate function (Te=1.14Tv−41.6) for the content of at least 2% and less than 5%. Therefore, when compared at the same Tv, the case having a MgO content of at least 0% and less than 2% had Te lower than, and thus was superior in the heat-absorbing property to, the case having a MgO content of at least 2% and less than 5%. Further, among the cases having MgO contents of at least 2% and less than 3%, at least 3% and less than 4%, and at least 4% and less than 5%, no difference was observed. Thus, there was no such a simple tendency that as the MgO content decreases, the heat-absorbing property increases.

From the foregoing, it has been found that by adjusting the MgO content to be at least 0% and less than 2%, it is possible to easily improve the heat-absorbing property without impairing the visible light transmittance.

INDUSTRIAL APPLICABILITY

The heat-absorbing glass plate of the present invention is characterized in that it satisfies both low solar transmittance and high visible light transmittance, has a green color as transmitted light and has a small number of coloring components, and accordingly it is useful as a glass plate for vehicles and for buildings, and is particularly suitable as a glass plate for automobiles.

This application is a continuation of PCT Application No. PCT/JP2012/051113, filed on Jan. 19, 2012, which is based upon and claims the benefit of priority from Japanese Patent Application No. 2011-012847 filed on Jan. 25, 2011. The contents of those applications are incorporated herein by reference in its entirety.

What is claimed is:

1. A heat-absorbing glass plate
   which has a solar transmittance of at most 40% calculated as 4 mm thickness of the glass plate as defined in JIS R3106 (1998),
   which has a visible light transmittance (by illuminant A, 2° visual field) of at least 71.5% calculated as 4 mm thickness of the glass plate as defined in JIS R3106 (1998),
   which provides a transmitted light having a dominant wavelength of from 492 to 520 nm as defined in JIS Z8701 (1982), and
   which comprises, as represented by mass % based on the following oxides:
   $SiO_2$: 65 to 75%,
   $Al_2O_3$: more than 3% and at most 6%
   MgO: at least 0% and less than 2%,
   CaO: 7 to 10%,
   $Na_2O$: 5 to 18%,
   $K_2O$: 0 to 5%,
   total iron as calculated as $Fe_2O_3$: 0.45 to 0.65%, and
   $TiO_2$: 0.2 to 0.8%,
   and which contains substantially no member selected from the group consisting of CoO, $Cr_2O_3$, $V_2O_5$ and MnO,
   wherein the proportion of the mass of divalent FeO in the mass of total iron which is the amount of total iron as calculated as $Fe_2O_3$, is more than 42% and at most 60%.

2. The heat-absorbing glass plate according to claim 1, which contains $CeO_2$ within a range of more than 0% and at most 3% as represented by mass % based on an oxide and which has an ultraviolet transmittance of at most 12% as defined in ISO-9050.

3. The heat-absorbing glass plate according to claim 2, wherein the content of total iron as calculated as $Fe_2O_3$ is from 0.47 to 0.60%.

4. The heat-absorbing glass plate according to claim 1, wherein $\beta_{-OH}$ is from 0.20 to 0.35 $mm^{-1}$.

5. A process for producing a heat-absorbing glass plate, which comprises melting a glass raw material, followed by forming to produce soda lime silica glass thereby to obtain a heat-absorbing glass plate, wherein
   the glass after the forming comprises, as represented by mass % based on oxides:
   $SiO_2$: 65 to 75%,
   $Al_2O_3$: more than 3% and at most 6%
   MgO: at least 0% and less than 2%,
   CaO: 7 to 10%,
   $Na_2O$: 5 to 18%, $K_2O$: 0 to 5%,
total iron as calculated as $Fe_2O_3$: 0.45 to 0.65%, and
$TiO_2$: 0.2 to 0.8%,
and contains substantially no member selected from the group consisting of CoO, $Cr_2O_3$, $V_2O_5$ and MnO,
wherein the proportion of the mass of divalent FeO in the mass of total iron which is the amount of total iron as calculated as $Fe_2O_3$, is more than 42% and at most 60%, and
the glass after the forming has a solar transmittance of at most 40% calculated as 4 mm thickness of the glass plate as defined in JIS R3106 (1998),
has a visible light transmittance (by illuminant A, 2° visual field) of at least 71.5% calculated as 4 mm thickness of the glass plate as defined in JIS R3106 (1998),
and provides a transmitted light having a dominant wavelength of from 492 to 520 nm as defined in JIS Z8701 (1982).

\* \* \* \* \*